United States Patent
Asano

(10) Patent No.: US 9,748,811 B2
(45) Date of Patent: Aug. 29, 2017

(54) STATOR FOR ROTATING ELECTRIC MACHINE

(71) Applicant: DENSO CORPORATION, Kariya, Aichi (JP)

(72) Inventor: Nobuhiro Asano, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/473,061

(22) Filed: Aug. 29, 2014

(65) Prior Publication Data
US 2015/0061434 A1    Mar. 5, 2015

(30) Foreign Application Priority Data
Sep. 4, 2013 (JP) .................................. 2013-182709

(51) Int. Cl.
*H02K 3/12* (2006.01)
*H02K 3/28* (2006.01)
*H02K 3/50* (2006.01)

(52) U.S. Cl.
CPC .............. *H02K 3/28* (2013.01); *H02K 3/12* (2013.01); *H02K 3/505* (2013.01)

(58) Field of Classification Search
CPC  H02K 3/12; H02K 3/28; H02K 3/505; H02K 3/04; H02K 3/48
USPC .......... 310/71, 184, 194, 195, 198, 201, 206
See application file for complete search history.

(56) References Cited

U.S. PATENT DOCUMENTS

| | | | | |
|---|---|---|---|---|
| 5,998,903 A | * | 12/1999 | Umeda | H02K 1/243 310/179 |
| 6,204,586 B1 | | 3/2001 | Umeda et al. | |
| 6,459,187 B1 | * | 10/2002 | Oohashi | H02K 1/16 29/605 |
| 6,515,393 B2 | * | 2/2003 | Asao | H02K 3/28 310/179 |

(Continued)

FOREIGN PATENT DOCUMENTS

| | | | |
|---|---|---|---|
| JP | A-2001-103697 | 4/2001 | |
| JP | A-2006-280121 | 10/2006 | |
| JP | WO 2013-042478 | * 3/2013 | ............... H02K 3/28 |

OTHER PUBLICATIONS

English translation for WO 2013-042478 corresponding to document (N); Nakayama et al.; Mar. 2013.*

(Continued)

*Primary Examiner* — Joshua Benitez-Rosario
*Assistant Examiner* — Ahmed Elnakib
(74) *Attorney, Agent, or Firm* — Oliff PLC

(57) ABSTRACT

A stator includes an annular stator core, a stator coil and a plurality of lead wires. The stator coil is comprised of windings mounted on the stator core and has a coil end part protruding from an axial end face of the stator core. Each of the lead wires is made up of a corresponding one of end portions of the windings of the stator coil. The lead wires include, at least, a first lead wire and a second lead wire. The first lead wire has a radially-extending part that adjoins the coil end part of the stator coil and extends in a radial direction of the stator core. The second lead wire has a circumferentially-extending part that adjoins and intersects the radially-extending part of the first lead wire and is located on the opposite side of the radially-extending part to the coil end part of the stator coil.

6 Claims, 10 Drawing Sheets

(56) References Cited

U.S. PATENT DOCUMENTS

| | | | |
|---|---|---|---|
| 6,661,146 B2* | 12/2003 | Oohashi | H02K 3/28 310/179 |
| 6,784,583 B2* | 8/2004 | Umeda | H02K 3/28 310/179 |
| 8,030,812 B2* | 10/2011 | Tanaka | H02K 3/12 310/201 |
| 2001/0026109 A1* | 10/2001 | Higashino | H02K 3/50 310/201 |
| 2002/0047445 A1* | 4/2002 | Ooiwa | H02K 3/30 310/179 |
| 2002/0063488 A1* | 5/2002 | Ooiwa | H02K 3/12 310/179 |
| 2004/0061400 A1* | 4/2004 | Fukushima | H02K 3/28 310/184 |
| 2005/0248229 A1* | 11/2005 | Even | H02K 3/28 310/180 |
| 2006/0163959 A1* | 7/2006 | Ogawa | H02K 3/38 310/71 |
| 2006/0220488 A1* | 10/2006 | Koike | H02K 3/28 310/179 |
| 2010/0141078 A1* | 6/2010 | Kouda | H02K 3/12 310/195 |
| 2011/0163625 A1* | 7/2011 | Fukushima | H02K 3/12 310/198 |
| 2011/0181146 A1* | 7/2011 | Asano | H02K 3/12 310/208 |

OTHER PUBLICATIONS

English translation of WO 2013042478; Nakayama et al. Mar. 2013; Japan.*
Jul. 3, 2015 Office Action issued in Japanese Patent Application No. 2013-182709.

* cited by examiner

FRONT SIDE ←→ REAR SIDE

↓ RADIALLY OUTWARD

STATOR FOR ROTATING ELECTRIC MACHINE

CROSS-REFERENCE TO RELATED APPLICATION

This application is based on and claims priority from Japanese Patent Application No. 2013-182709 filed on Sep. 4, 2013, the content of which is hereby incorporated by reference in its entirety into this application.

BACKGROUND

1. Technical Field

The present invention relates to stators for rotating electric machines that are used in, for example, motor vehicles as electric motors and electric generators.

2. Description of Related Art

Japanese Patent Application Publication No. JP2001-103697A discloses a stator for a rotating electric machine. In the stator, lead portions of phase windings of a stator coil, which are connected to ends of other phase windings of the stator coil, are fixed to a coil end part of the stator coil by an electrically-insulative adhesive instead of by binding them to the coil end part with threads. With the above method of fixing the lead portions to the coil end part, it is possible to prevent scratches from being formed on the lead portions by friction, secure electrical insulation between the phase windings of the stator coil and reduce man-hours required for manufacturing the stator.

However, with the above stator, in some cases, vibration load imposed on spots where the lead portions (or lead wires) are fixed to the coil end part of the stator coil may become large, thereby lowering the vibration resistance of the stator; those cases include cases where the stator coil is made of electric conductors having a large cross-sectional area so as to reduce the electrical resistance of the stator coil and cases where the rotating electric machine is used in a motor vehicle that is subject to severe vibration.

The above problem may be solved by increasing the amount of the adhesive used to fix the lead portions to the coil end part of the stator coil. However, in this case, the manufacturing cost of the stator would be increased with the increase in the amount of the adhesive.

Moreover, in recent years, with diversification in stator coil specifications, the arrangement of the lead portions has become complicated and thus the number of the spots where the lead portions are fixed to the coil end part of the stator coil has been increased. Consequently, the amount of the adhesive used to fix the lead portions to the coil end part of the stator coil has been accordingly increased, thereby resulting in an increase in the manufacturing cost of the stator. In addition, with the complication of the arrangement of the lead portions and the increase in the number of the spots where the lead portions are fixed to the coil end part of the stator coil, the gap between the stator coil and a frame of the rotating electric machine which receives the stator therein may be accordingly reduced, thereby lowering the environmental resistance of the rotating electric machine.

SUMMARY

According to an exemplary embodiment, there is provided a stator for a rotating electric machine. The stator includes an annular stator core, a stator coil and a plurality of lead wires. The stator core has a plurality of slots formed therein. The slots are spaced from one another in a circumferential direction of the stator core. The stator coil is comprised of a plurality of windings mounted on the stator core. The stator coil has a coil end part that protrudes from an axial end face of the stator core. Each of the plurality of lead wires is made up of a corresponding one of end portions of the windings of the stator coil. The plurality of lead wires include, at least, a first lead wire and a second lead wire. The first lead wire has a radially-extending part that adjoins the coil end part of the stator coil and extends in a radial direction of the stator core. The second lead wire has a circumferentially-extending part that adjoins and intersects the radially-extending part of the first lead wire and is located on the opposite side of the radially-extending part to the coil end part of the stator coil.

With the above configuration, the radially-extending part of the first lead wire is sandwiched between the coil end part of the stator coil and the circumferentially-extending part of the second lead wire. Consequently, the vibration resistance of the stator is improved.

The plurality of lead wires may further include, in addition to the first and second lead wires, a third lead wire to which the first lead wire is joined. In this case, it is preferable that the first and third lead wires are joined at a spot positioned radially inside the radially-extending part of the first lead wire.

It is preferable that the radially-extending part of the first lead wire is formed prior to the mounting of the winding, which includes the first lead wire as its end portion, on the stator core.

It is also preferable that each of the first and second lead wires has a substantially rectangular cross section. Moreover, the plurality of lead wires may further include, in addition to the first and second lead wires, a third lead wire to which the first lead wire is joined. In this case, it is preferable that: the third lead wire also has a substantially rectangular cross section; and the first and third lead wires are joined with a shorter side of the substantially rectangular cross section of one of the first and third lead wires abutting a longer side of the substantially rectangular cross section of the other of the first and third lead wires.

It is also preferable that each of the windings of the stator coil is formed of a plurality of electric conductor segments inserted in corresponding ones of the slots of the stator core.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
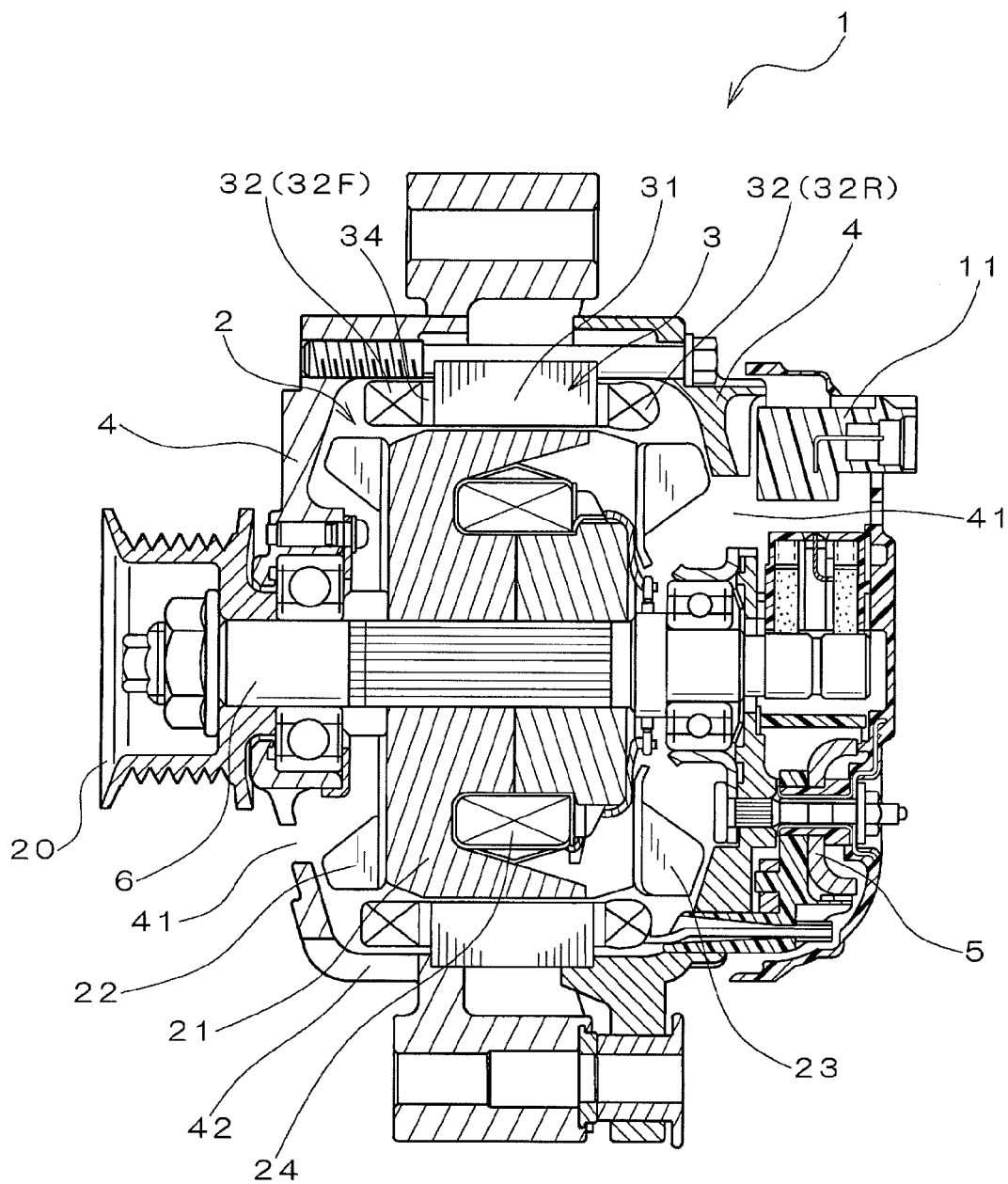
FIG. 1 is a schematic cross-sectional view of an automotive alternator which includes a stator according to the exemplary embodiment.

FIG. 1 shows the overall configuration of an automotive alternator 1 which includes a stator 3 according to an exemplary embodiment. The alternator 1 is designed to be used in a motor vehicle, such as a passenger car or a truck.

As shown in FIG. 1, the alternator 1 includes, in addition to the stator 3, a rotor 2, a frame 4, a rectifier 5, a voltage regulator 11 and a pulley 20.

The rotor 2 includes a rotating shaft 6, a pair of Lundell-type magnetic pole cores 21 and a field coil 24. The rotating shaft 6 is rotatably supported by the frame 4 via bearings. The rotating shaft 6 has the pulley 20 mounted on a front end portion (i.e., a left end portion in FIG. 1) thereof, so that it can be driven by an internal combustion engine (not shown in the figures) of the vehicle via the pulley 20. Each of the magnetic pole cores 21 has a plurality of magnetic pole claws. The field coil 24 is made of, for example, an insulation-treated copper wire and wound into an annular shape. The magnetic pole cores 21 are fixed on the rotating shaft 6 with the field coil 24 held between the magnetic pole cores 21. In addition, on a rear end portion (i.e., a right end portion in FIG. 1) of the rotating shaft 6, there are provided a pair of slip rings via which field current is supplied to the field coil 24 during rotation of the rotor 2.

The stator 3 includes an annular (or hollow cylindrical) stator core 31 and a stator coil 32 mounted on the stator core 31. The detailed configuration of the stator 3 will be described later.

The frame 4 has both the rotor 2 and the stator 3 retained therein so that the stator 3 surrounds a radially outer periphery of the rotor 2 with a predetermined radial gap formed therebetween.

The rectifier 5 rectifies three-phase AC power outputted from the stator coil 32 into DC power and outputs the obtained DC power via output terminals thereof.

The voltage regulator 11 regulates the voltage of the DC power outputted from the rectifier 5.

Moreover, in the present embodiment, the alternator 1 further includes a pair of cooling fans 22 and 23 that are respectively provided on axial end faces of the magnetic pole cores 21 of the rotor 2. The cooling fans 21 and 22 suck cooling air into the alternator 1 via suction openings 41 formed in front and rear end walls of the frame 4 and discharge the cooling air out of the alternator 1 via discharge openings 42 formed in a circumferential wall (or side wall) of the frame 4. With the cooling air, it is possible to cool the stator coil 32, the rectifier 5 and the regulator 11 during operation of the alternator 1. In addition, it should be noted that though not shown in FIG. 1, the discharge openings 42 are formed not only in a front part but also in a rear part of the frame 4.

After having described the overall configuration of the alternator 1, the detailed configuration of the stator 3 according to the present embodiment will be described with reference to FIGS. 2-9.

In the present embodiment, the annular stator core 31 is formed by laminating a plurality of steel sheets in the axial direction. In the radially inner surface of the stator core 31, there are formed a plurality of slots 310 so as to penetrate the stator core 31 in the axial direction. Moreover, the slots 310 are spaced from one another in the circumferential direction of the stator core 31 at a constant pitch and each extend in a radial direction of the stator core 31. That is, for each of the slots 310, the depth direction of the slot 310 coincides with the radial direction of the stator core 31.

The stator coil 32 is mounted on the stator core 31 so as to be partially received in the slots 310 of the stator core 31 with insulating sheets 34 interposed between the stator coil 32 and those internal walls of the stator core 31 which define the slots 310. Moreover, as shown in FIG. 1, the stator coil 32 has a front-side coil end part 32F protruding from a front end face (or one axial end face) of the stator core 31 and a rear-side coil end part 32R protruding from a rear end face (or the other axial end face) of the stator core 31.

Figure 2:
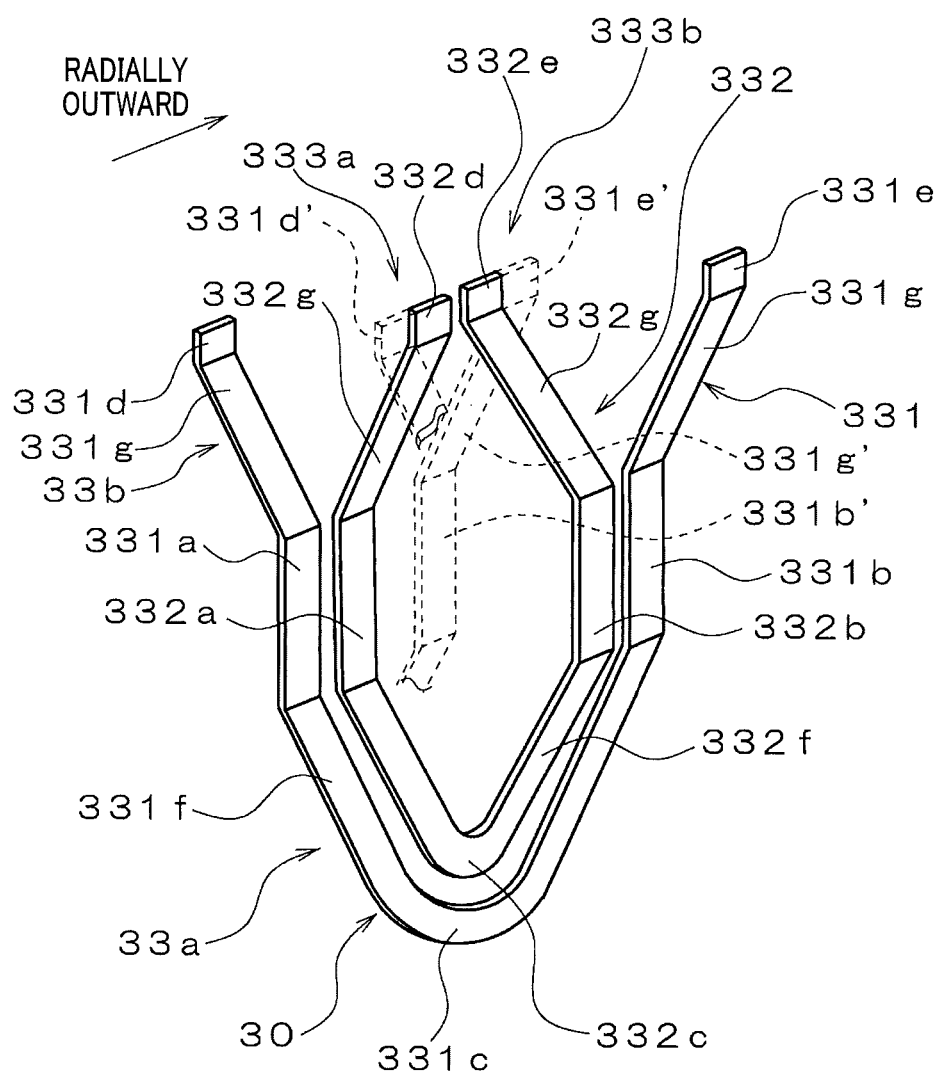
FIG. 2 is a schematic perspective view illustrating the configuration of electric conductor segments forming a stator coil of the stator.
Figure 3:
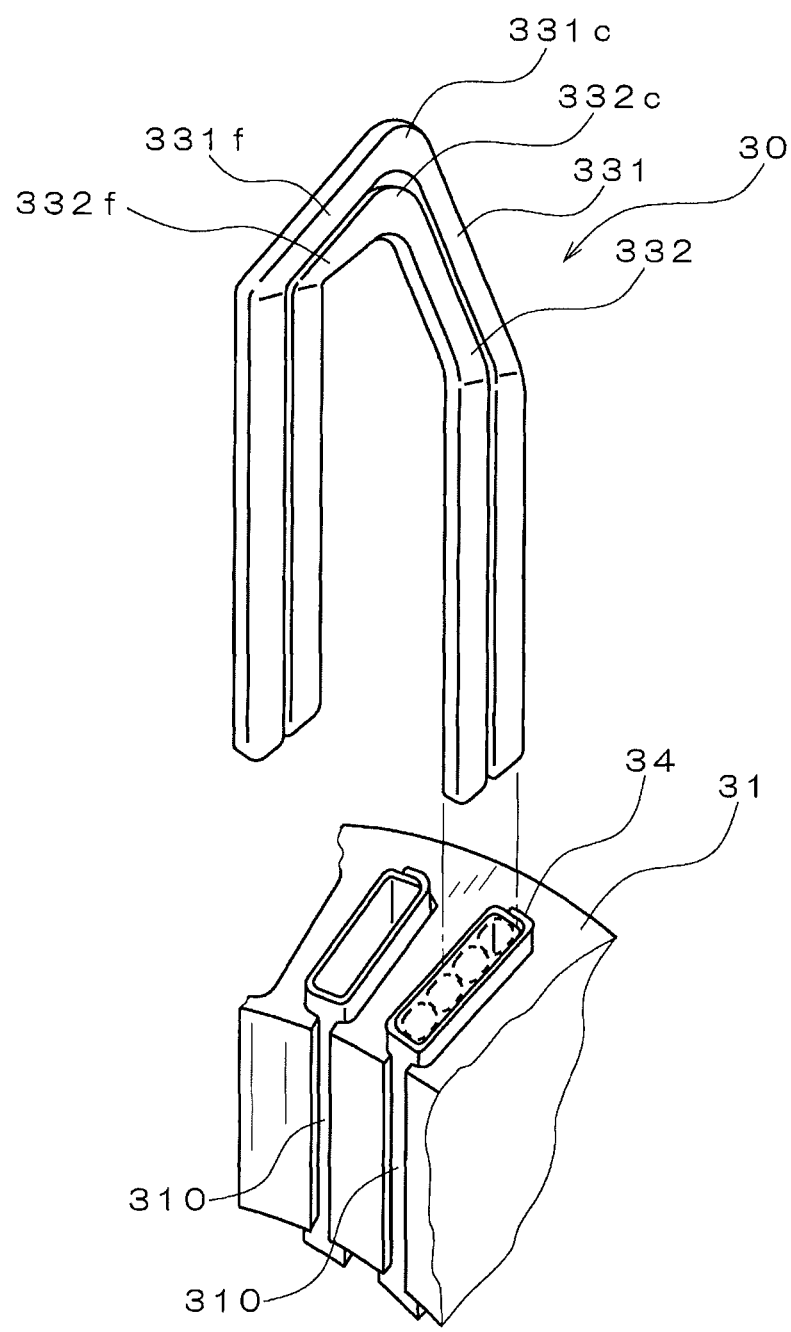
FIG. 3 is a schematic perspective view illustrating a process of inserting the electric conductor segments into slots formed in a stator core of the stator.

The stator coil 32 can be considered as being formed by connecting electric conductors received in the slots 310 of the stator core 31. That is, as illustrated in FIGS. 2-3, in each of the slots 310 of the stator core 31, there are received an even number (e.g., four in the present embodiment) of electric conductors in alignment with each other in the radial direction of the stator core 31 (or in the depth direction of the slot 310). Hereinafter, for the sake of convenience of explanation, the four electric conductors are sequentially referred to as an innermost conductor, an inner-middle conductor, an outer-middle conductor and an outermost conductor from the radially inside to the radially outside of the slot 310. In addition, in the present embodiment, each of the electric conductors has a substantially rectangular cross section.

Moreover, the electric conductors received in the slots 310 of the stator core 31 are electrically connected to one another in a predetermined pattern.

Specifically, referring to FIG. 2, for one of the slots 310, the innermost conductor 331a in the slot 310 is electrically connected, via a connecting conductor 331c, to the outermost conductor 331b in another one of the slots 310 which is positioned away from the slot 310 by one magnetic pole pitch in the clockwise direction; the connecting conductor 331c is located on one axial side of the stator core 31 (i.e., the lower side in FIG. 2 and the rear side in FIG. 1). In addition, it should be noted that "the clockwise direction" hereinafter denotes the clockwise direction with the point of sight located on the one axial side of the stator core 31.

Similarly, for one of the slots 310, the inner-middle conductor 332a in the slot 310 is connected, via a connecting conductor 332c, to the outer-middle conductor 332b in another one of the slots 310 which is positioned away from the slot 310 by one magnetic pole pitch in the clockwise direction; the connecting conductor 332c is also located on the one axial side of the stator core 31.

Consequently, on the one axial side of the stator core 31, each of the connecting conductors 332*c* that respectively connect pairs of the inner-middle conductors 332*a* and the outer-middle conductors 332*b* is partially surrounded by a corresponding one of the connecting conductors 331*c* that respectively connect pairs of the innermost conductors 331*a* and the outermost conductors 331*b*. As a result, all the connecting conductors 332*c* together form an axially inner layer of the rear-side coil end part 32R of the stator coil 32; all the connecting conductors 331*c* together form an axially outer layer of the rear-side coil end part 32R of the stator coil 32.

Moreover, for one of the slots 310, the inner-middle conductor 332*a* in the slot 310 is electrically connected, on the other axial side of the stator core 31 (i.e., the upper side in FIG. 2 and the front side in FIG. 1), to the innermost conductor 331'*a* in another one of the slots 310 which is positioned away from the slot 310 by one magnetic pole pitch in the clockwise direction. More specifically, the inner-middle conductor 332*a* is electrically connected to the innermost conductor 331'*a* by joining, for example by TIG welding or ultrasonic welding, a pair of connecting conductors 332*g* and 331*g*' that respectively extend from the inner-middle conductor 332*a* and the innermost conductor 331*a*'. In addition, it should be noted that the superscript ['] (i.e., apostrophe) is attached to some of the electric conductors hereinafter only for the sake of convenience of explanation and ease of understanding.

Similarly, for one of the slots 310, the outermost conductor 331*b*' in the slot 310 is electrically connected, on the other axial side of the stator core 31, to the outer-middle conductor 332*b* in another one of the slots 310 which is positioned away from the slot 310 by one magnetic pole pitch in the clockwise direction. More specifically, the outermost conductor 331*b*' is electrically connected to the outer-middle conductor 332*b* by joining, for example by TIG welding or ultrasonic welding, a pair of connecting conductors 331*g*' and 332*g* that respectively extend from the outermost conductor 331*b*' and the outer-middle conductor 332*b*.

Figure 4:
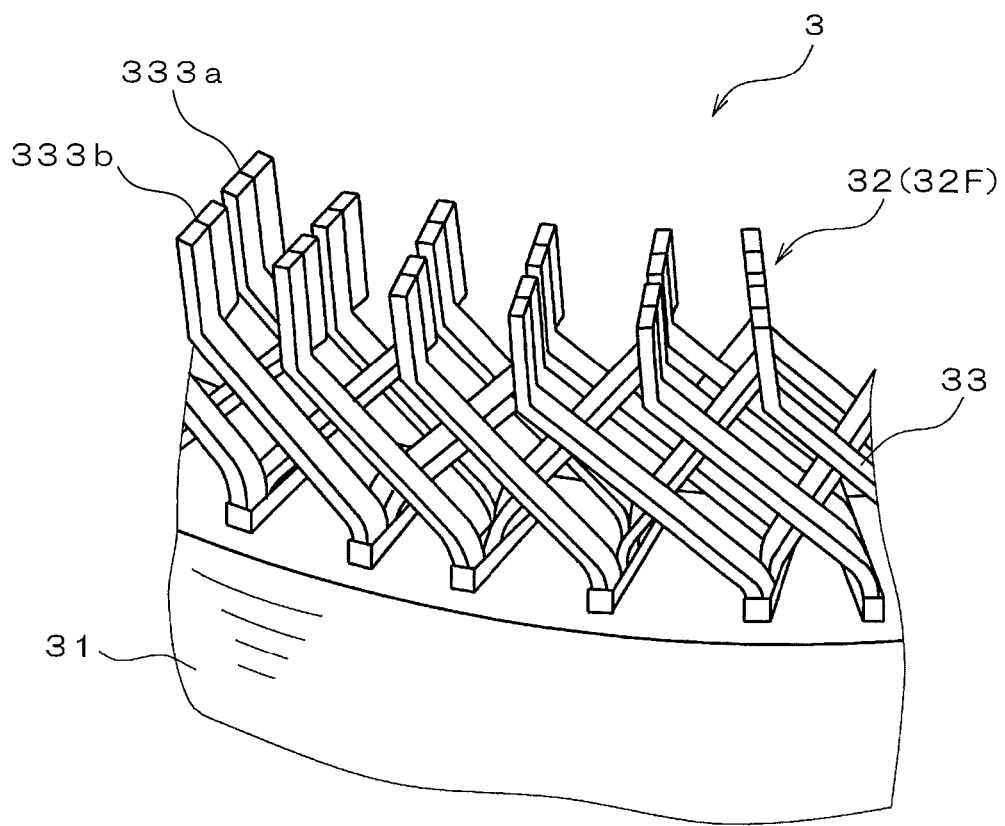
FIG. 4 is a schematic perspective view illustrating pairs of end portions of the electric conductor segments joined at a front-side coil end part of the stator coil.

Consequently, on the other axial side of the stator core 31, each of joints 333*a* formed between end portions 332*d* of the connecting conductors 332*g* and end portions 331*d*' of the connecting conductors 331*g*' is offset from a corresponding one of joints 333*b* formed between end portions 331*e*' of the connecting conductor 331*g*' and end portions 332*e* of the connecting conductors 332*g* both in the radial and circumferential directions of the stator core 31. As a result, as shown in FIG. 4, all the joints 333*a* fall on the same circle to form a radially inner layer of the front-side coil end part 32F of the stator coil 32; all the joints 333*b* fall on the same circle to form a radially outer layer of the front-side coil end part 32F.

Moreover, in the present embodiment, the stator coil 32 is formed of a plurality of substantially U-shaped electric conductor segments 30. Further, the electric conductor segments 30 are comprised of a plurality of pairs of large and small electric conductor segments 331 and 332. More specifically, as shown in FIG. 2, each connected set of the innermost conductor 331*a*, outermost conductor 331*b*, connecting conductor 331*c* on the one axial side of the stator core 31 and connecting conductors 331*g* on the other axial side of the stator core 31 is formed in one piece construction by using one of the large electric conductor segments 331. Similarly, each connected set of the inner-middle conductor 332*a*, outer-middle conductor 332*b*, connecting conductor 332*c* on the one axial side of the stator core 31 and connecting conductors 332*g* on the other axial side of the stator core 31 is formed in one piece construction by using one of the small electric conductor segments 332.

In other words, each of the large electric conductor segments 331 has a pair of in-slot portions 331*a* and 331*b* respectively received in two slots 310 of the stator core 31 which are circumferentially apart from each other by one magnetic pole pitch, a turn portion 331*c* that connects the pair of in-slot portions 331*a* and 331*b* on the one axial side of the stator core 31, and a pair of oblique portions 331*g* that respectively protrude from the pair of in-slot portions 331*a* and 331*b* on the other axial side of the stator core 31 and extend obliquely at predetermined angles with respect to the axial direction of the stator core 31. In addition, the turn portion 331*c* includes a pair of oblique portions 331*f* that extend obliquely at predetermined angles with respect to the axial direction of the stator core 31. Similarly, each of the small electric conductor segments 332 has a pair of in-slot portions 332*a* and 332*b* respectively received in two slots 310 of the stator core 31 which are circumferentially apart from each other by one magnetic pole pitch, a turn portion 332*c* that connects the pair of in-slot portions 332*a* and 332*b* on the one axial side of the stator core 31, and a pair of oblique portions 332*g* that respectively protrude from the pair of in-slot portions 332*a* and 332*b* on the other axial side of the stator core 31 and extend obliquely at predetermined angles with respect to the axial direction of the stator core 31. In addition, the turn portion 332*c* includes a pair of oblique portions 332*f* that extend obliquely at predetermined angles with respect to the axial direction of the stator core 31.

Consequently, with the large and small electric conductor segments 331 and 332, the stator coil 32 is formed in a lap winding manner on the stator core 31. Moreover, all of the turn portions 331*c* of the large electric conductor segments 331 and the turn portions 332*c* of the small electric conductor segments 332 together make up the rear-side coil end part 32R of the stator coil 32; all of the oblique portions 331*g* of the large electric conductor segments 331 and the oblique portions 332*g* of the small electric conductor segments 332 together make up the front-side coil end part 32F of the stator coil 32 (see FIG. 1). In addition, during rotation of the rotor 2, the flow of cooling air created by the cooling fans 22 and 23 passes through the front-side and rear-side coil end parts 32F and 32R of the stator coil 32, thereby cooling them.

Figure 5:
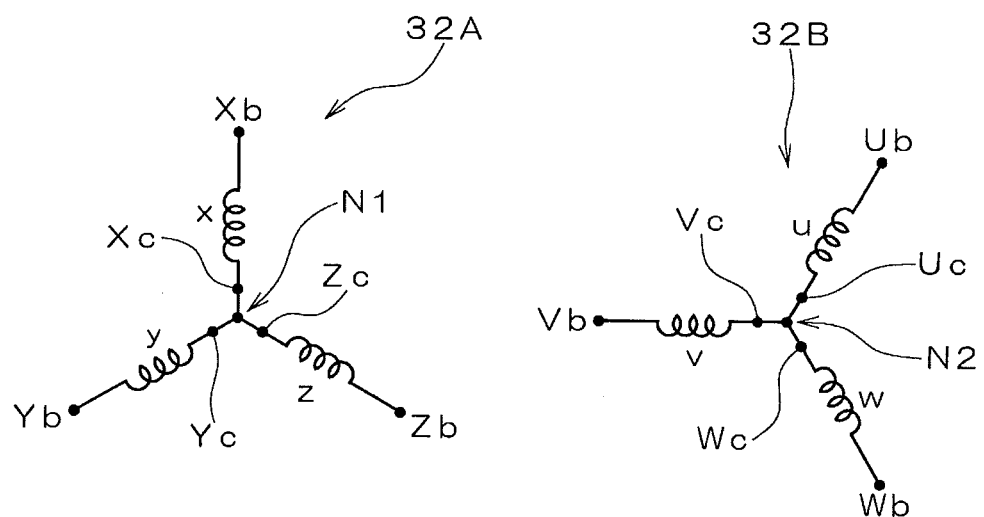
FIG. 5 is a schematic circuit diagram of the stator coil which is comprised of a pair of three-phase coils.

In the present embodiment, the electric conductor segments 30 are electrically connected in the above-described manner to form a pair of first and second three-phase coils 32A and 32B as shown in FIG. 5. Moreover, the first and second three-phase coils 32A and 32B together make up the stator coil 32. In other words, in the present embodiment, the stator coil 32 is comprised of the pair of three-phase coils 32A and 32B. In addition, the first and second three-phase coils 32A and 32B are mounted on the stator core 31 so as to be different in phase from each other by 30° in electrical angle.

Figure 6:
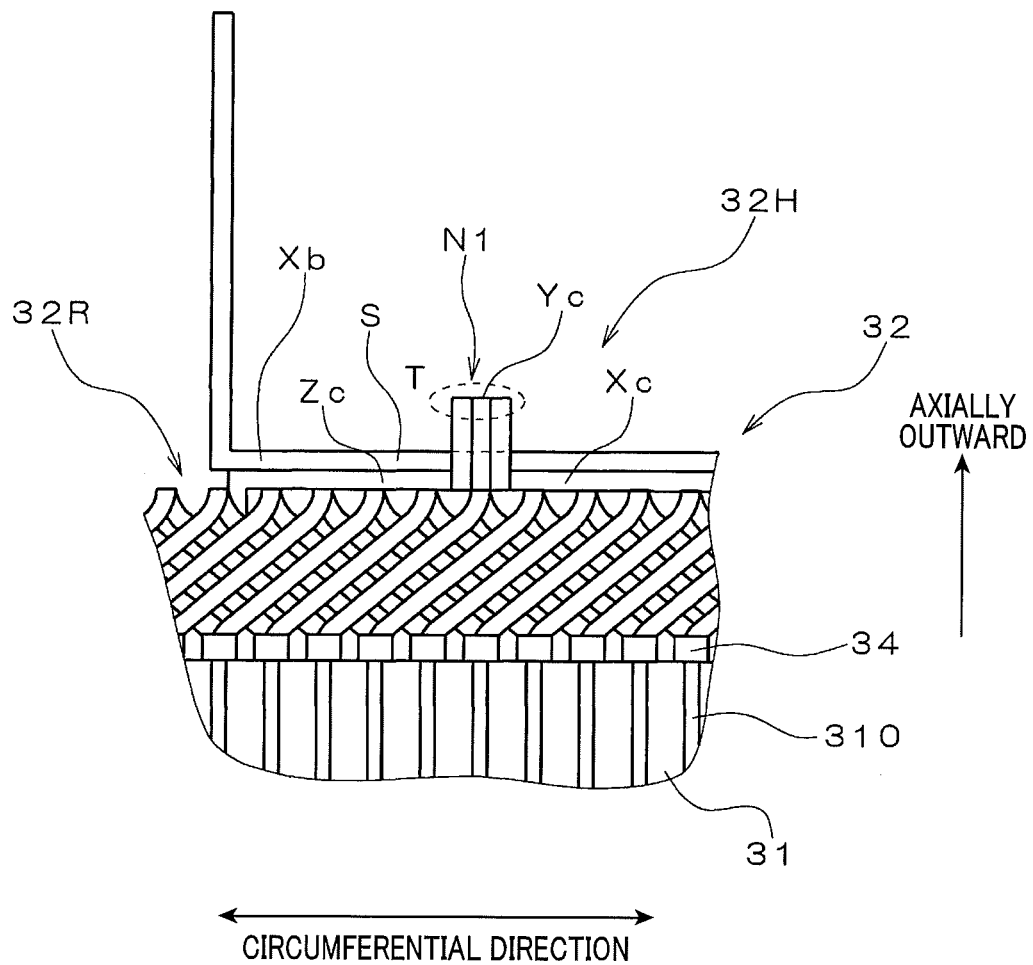
FIG. 6 is a side view illustrating the arrangement of lead wires of one of the three-phase coils.

As shown in FIGS. 5-6, the first three-phase coil 32A includes three phase windings x, y and z, which are Y-connected with each other. The phase winding x has its opposite end portions respectively led out as lead wires Xb and Xc from the rear-side coil end part 32R of the stator coil 32. The phase winding y has its opposite end portions respectively led out as lead wires Yb and Yc from the rear-side coil end part 32R. The phase winding z has its opposite end portions respectively led out as lead wires Zb and Zc from the rear-side coil end part 32R. The lead wires Xb, Yb and Zb are electrically connected to the rectifier 5 of the alternator 1. On the other hand, the lead wires Xc, Yc and Zc are joined together to define a neutral point N1 of the first three-phase coil 32A.

Similarly, the second three-phase coil 32B includes three phase windings u, v and w, which are Y-connected with each other. The phase winding u has its opposite end portions respectively led out as lead wires Ub and Uc from the rear-side coil end part 32R of the stator coil 32. The phase winding v has its opposite end portions respectively led out as lead wires Vb and Vc from the rear-side coil end part 32R. The phase winding w has its opposite end portions respectively led out as lead wires Wb and Wc from the rear-side coil end part 32R. The lead wires Ub, Vb and Wb are electrically connected to the rectifier 5 of the alternator 1. On the other hand, the lead wires Uc, Vc and Wc are joined together to define a neutral point N2 of the second three-phase coil 32B.

Moreover, in the present embodiment, the lead wires Xb-Zb, Xc-Zc, Ub-Wb and Uc-Wc are formed in predetermined shapes to together form a coil lead part 32H of the stator coil 32.

Figure 7:
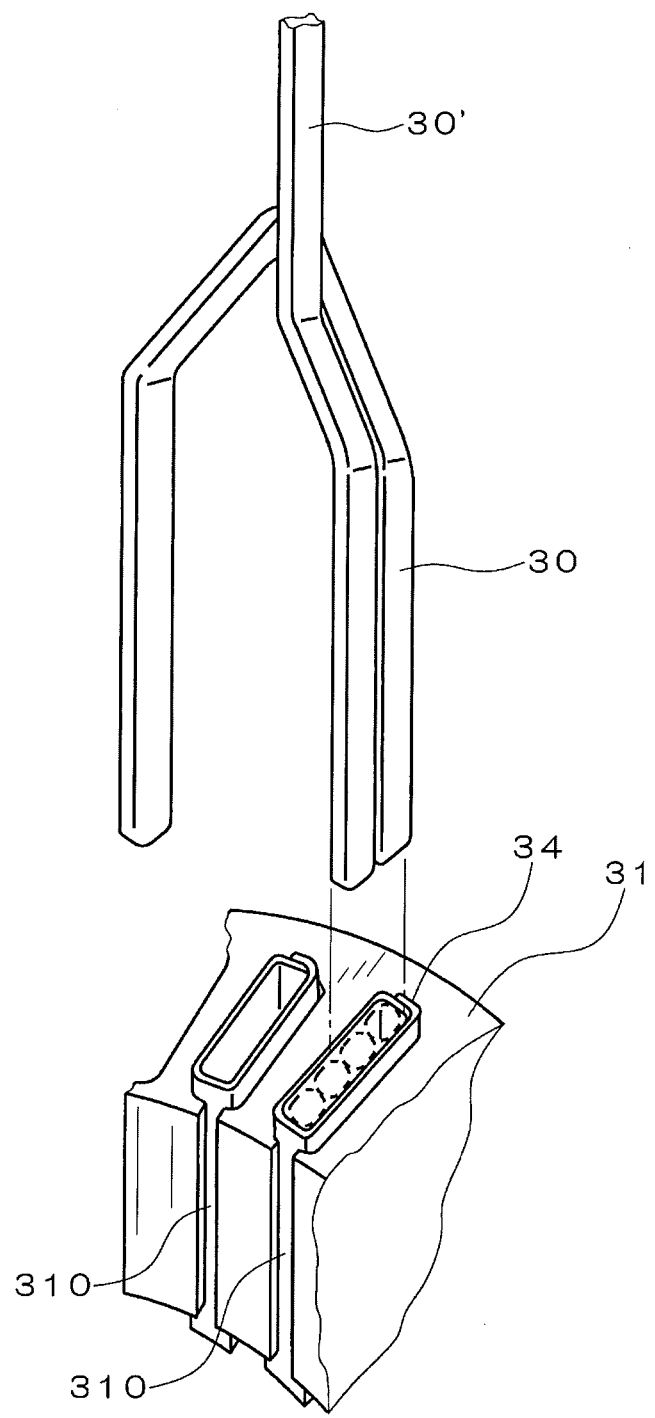
FIG. 7 is a schematic perspective view illustrating the configuration of electric conductor segments forming the lead wires.

Specifically, as shown in FIG. 7, the lead wires Xb-Zb, Xc-Zc, Ub-Wb and Uc-Wc are formed using electric conductor segments 30' that have a substantially rectangular cross section. Compared to the above-described substantially U-shaped electric conductor segments 30, each of the electric conductor segments 30' is not bent back at the turn portion, thus having two straight portions extending parallel to each other. Each of the electric conductor segments 30' is inserted in a corresponding one of the slots 310 of the stator core 31 from the one axial side of the stator core 31 (i.e., the upper side in FIG. 7 and the rear side in FIG. 1), so as to have an end portion thereof protruding from the corresponding slot 310 on the other axial side (i.e., the lower side in FIG. 7 and the front side in FIG. 1). The end portion is then bent to extend obliquely at a predetermined angle with respect to the axial direction of the stator core 31. Thereafter, the end portion is joined to a corresponding one of the oblique portions of the electric conductor segments 30 (i.e., the oblique portions 331g of the large electric conductor segments 331 and the oblique portions 332g of the small electric conductor segments 332 in FIG. 2), thereby making up a portion of the front-side coil end part 32F of the stator coil 32 as shown in FIG. 4.

Accordingly, with the electric conductor segments 30', it is possible to easily form the lead wires Xb-Zb, Xc-Zc, Ub-Wb and Uc-Wc.

Figure 8:
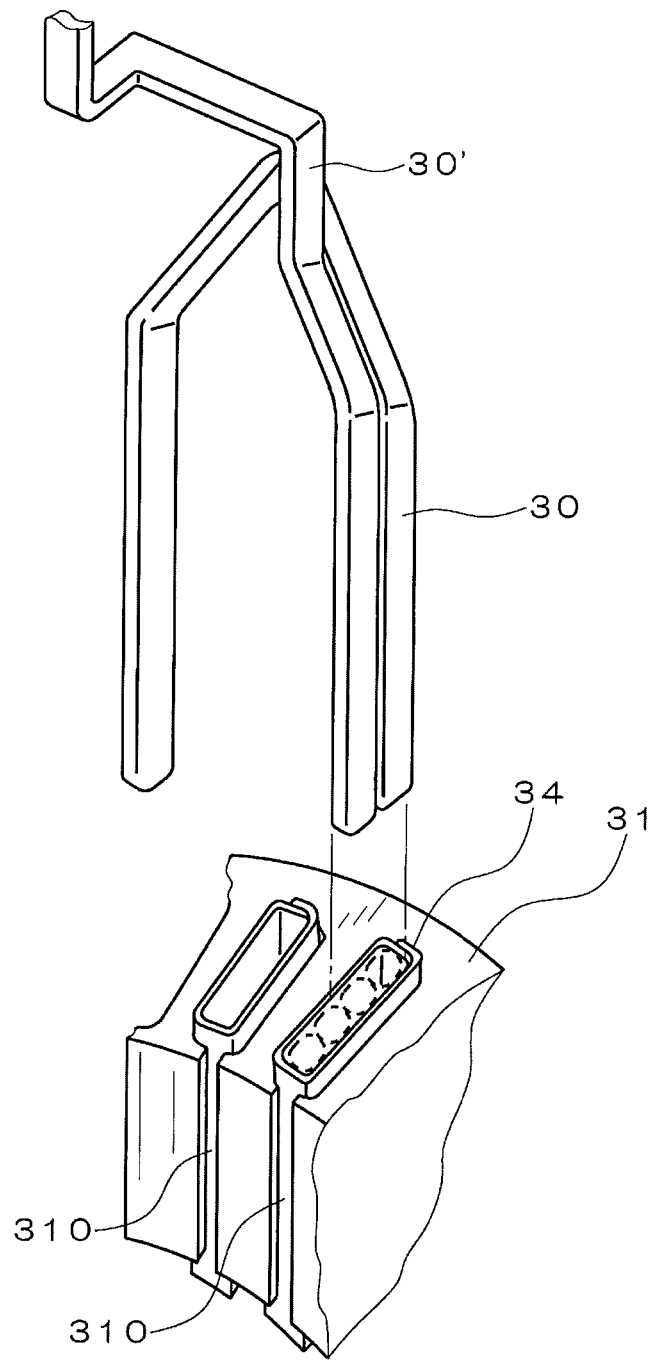
FIG. 8 is a schematic perspective view illustrating the pre-shaping of the electric conductor segments forming the lead wires prior to insertion of the electric conductor segments into the slots of the stator core.

Moreover, as illustrated in FIG. 8, in the present embodiment, the electric conductor segments 30' are further shaped to have the predetermined shapes of the respective lead wires Xb-Zb, Xc-Zc, Ub-Wb and Uc-Wc prior to the insertion thereof into the corresponding slots 310 of the stator core 31.

Next, the shapes of the lead wires Xb-Zb, Xc-Zc, Ub-Wb and Uc-Wc according to the present embodiment will be described in detail.

As described previously, in the present embodiment, the stator coil 32 is comprised of the pair of first and second three-phase coils 32A and 32B. The second three-phase coil 32B has the same configuration and features as the first three-phase coil 32A. Therefore, for the sake of avoiding redundancy, only the shapes of the lead wires of the first three-phase coil 32A will be described hereinafter.

In the present embodiment, the first three-phase coil 32A includes the lead wires each of which is made up of a corresponding one of the end portions of the phase windings x, y and z. The lead wires include, at least, a first lead wire and a second lead wire. The first lead wire has a radially-extending part R that adjoins the rear-side coil end part 32R of the stator coil 32 and extends in a radial direction of the stator core 31. The second lead wire has a circumferentially-extending part S that adjoins and intersects the radially-extending part R of the first lead wire and is located on the opposite side of the radially-extending part R to the rear-side coil end part 32R. That is, the radially-extending part R of the first lead wire is sandwiched between the rear-side coil end part 32R of the stator coil 32 and the circumferentially-extending part S of the second lead wire.

Figure 9:
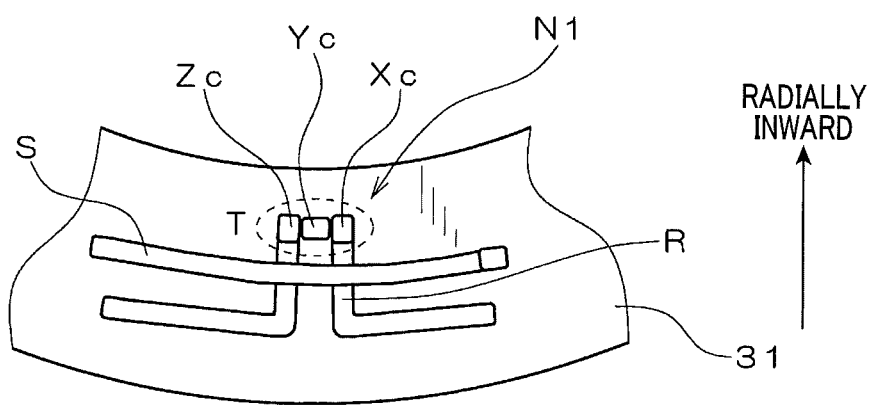
FIG. 9 is an axial end view illustrating the arrangement of the lead wires according to the exemplary embodiment.
Figure 10:
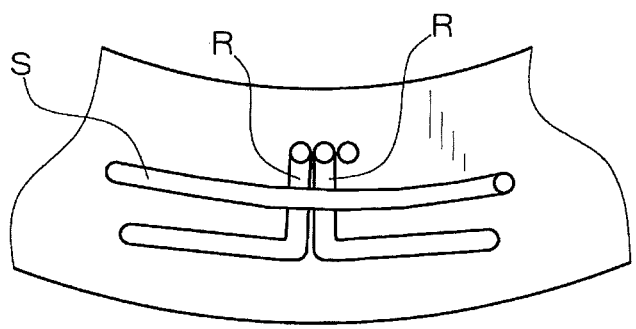
FIG. 10 is an axial end view illustrating the arrangement of lead wires according to a first modification.
Figure 11:
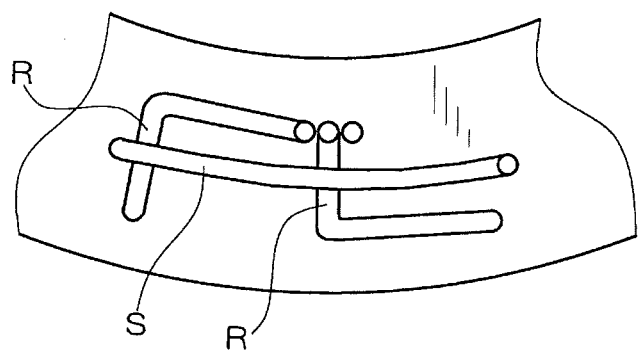
FIG. 11 is an axial end view illustrating the arrangement of lead wires according to a second modification.
Figure 12:
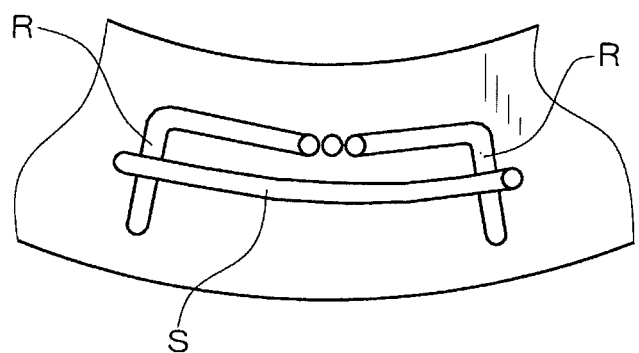
FIG. 12 is an axial end view illustrating the arrangement of lead wires according to a third modification.

More specifically, as shown in FIGS. 6 and 9, in the present embodiment, the three lead wires Xc, Yc and Zc of the first three-phase coil 32A are joined together to define the neutral point N1. Of the three lead wires Xc, Yc and Zc, each of the lead wires Xc and Zc is shaped so that after being led out from the rear-side coil end part 32R of the stator coil 32, the lead wire first extends circumferentially, then extends radially inward, and finally extends axially outward to the joint T between the three lead wires Xc, Yc and Zc. That is, each of the lead wires Xc and Zc is configured as a first lead wire which includes the radially-extending part R.

On the other hand, the lead wire Xb is shaped so that after being led out from the rear-side coil end part 32R of the stator coil 32, the lead wire Xb first extends circumferentially and then extends axially outward so as to be connected to the rectifier 5 of the alternator 1. The circumferentially-extending part S of the lead wire Xb adjoins and intersects the radially-extending parts R of the lead wires Xc and Zc (i.e., the first lead wires) and is located on the opposite side of the radially-extending parts R to the rear-side coil end part 32R of the stator coil 32. That is, the lead wire Xb is configured as a second lead wire which includes the circumferentially-extending part S.

With the above shapes of the lead wires Xc, Zc and Xb, the radially-extending parts R of the lead wires Xc and Zc are sandwiched between the rear-side coil end part 32R of the stator coil 32 and the circumferentially-extending part S of the lead wire Xb. Consequently, the vibration resistance of the stator 3 is improved.

Moreover, in the present embodiment, as shown in FIG. 9, both the lead wires Xc and Zc (i.e., the first lead wires) are jointed to the lead wire Yc (i.e., a third lead wire) at a spot positioned radially inside the radially-extending parts R of the lead wires Xc and Zc. Consequently, even in the case of the frame 4 of the alternator 1 being shaped so that the axial distances between the front and rear end walls of the frame 4 and the stator 3 are decreased in a radially outward direction (see FIG. 1), it is still possible to secure a sufficient axial gap between the rear end wall of the frame 4 and the joint T between the lead wires Xc, Yc and Zc. As a result, it is possible to improve the environmental resistance of the alternator 1.

Furthermore, in the present embodiment, as shown in FIG. 9, at the joint T, the first lead wires Xc and Zc are joined to the second lead wire Yc with a longer side of the substantially rectangular cross sections of the first lead wire Xc abutting one of the shorter sides of the substantially rectangular cross section of the third lead wire Yc and a longer side of the first lead wire Zc abutting the other shorter side of the substantially rectangular cross section of the third lead wire Yc. Consequently, when a bending load is imposed on the joint T in a longer-side direction of the first lead wires Xc and Zc (or alternatively the third lead wire Yc), the bending load will be applied to the third lead wire Yc (or alternatively the first lead wires Xc and Zc) in the shorter-side direction thereof. Consequently, it is possible to improve the strength of the joint T against the bending load.

The above-described stator 3 according to the present embodiment has the following advantages.

In the present embodiment, the stator 3 includes the annular stator core 31, the stator coil 32, and the lead wires Xb-Zb, Xc-Zc, Ub-Wb and Uc-Wc. The stator core 31 has the slots 310 formed therein so as to be spaced from one another in the circumferential direction of the stator core 31. The stator coil 32 is comprised of the three phase windings x, y and z of the first three-phase coil 32A and the three phase windings u, v and w of the second three-phase coil 32B. The stator coil 32 has the rear-side coil end part 32R that protrudes from the rear-side axial end face of the stator core 31. Each of the lead wires Xb-Zb, Xc-Zc, Ub-Wb and Uc-Wc is made up of a corresponding one of the end portions of the phase windings x-z and u-w of the stator coil 32. The lead wires include the first lead wires Xc and Zc and the second lead wire Xb. Each of the first lead wires Xc and Zc has the radially-extending part R that adjoins the rear-side coil end part 32R of the stator coil 32 and extends in the radial direction of the stator core 31. The second lead wire Xb has the circumferentially-extending part S that adjoins and intersects the radially-extending parts R of the first lead wires Xc and Zc. The circumferentially-extending part S is located on the opposite axial side of the radially-extending parts R to the rear-side coil end part 32R of the stator coil 32 (i.e., located on the rear side of the radially-extending parts R with the rear-side coil end part 32R located on the front side of the radially-extending parts R).

With the above configuration, the radially-extending parts R of the first lead wires Xc and Zc are sandwiched between the rear-side coil end part 32R of the stator coil 32 and the circumferentially-extending part S of the second lead wire Xb. Consequently, the vibration resistance of the stator 3 is improved.

Moreover, in the present embodiment, the first lead wires Xc and Zc are jointed to the third lead wire Yc at the spot positioned radially inside the radially-extending parts R of the first lead wires Xc and Zc.

Consequently, it is possible to secure a sufficient axial gap between the rear end wall of the frame 4 of the alternator 1 and the joint T between the lead wires Xc, Yc and Zc. As a result, it is possible to improve the environmental resistance of the stator 3.

In the present embodiment, the radially-extending parts R of the first lead wires Xc and Zc are formed prior to the mounting of the phase windings x and z on the stator core 31 (i.e., prior to the insertion of the electric conductor segments 30 and 30' forming the phase windings x and z into the corresponding slots 310 of the stator core 31); the phase windings x and z respectively include the lead wires Xc and Zc as their end portions.

Accordingly, in the present embodiment, it is possible to shape the first lead wires Xc and Zc taking into account springback occurring at the radially-extending parts R. Consequently, it is possible to reliably bring the radially-extending parts R of the first lead wires Xc and Zc into intimate contact with the rear-side coil end part 32R of the stator coil 32, thereby reducing the protruding height of the joint T between the first lead wires Xc and Zc and the third lead wire Yc from the rear-side coil end part 32R. As a result, it is possible to more reliably secure a sufficient axial gap between the joint T and the rear end wall of the frame 4 of the alternator 1. As a result, it is possible to further improve the environmental resistance of the stator 3.

In the present embodiment, each of the first lead wires Xc and Zc and the second lead wire Xb has the substantially rectangular cross section.

Consequently, it is possible to secure a large contact area between the circumferentially-extending part S of the second lead wire Xb and each of the radially-extending parts R of the first lead wires Xc and Zc, thereby further improving the vibration resistance of the stator 3.

Further, in the present embodiment, the third lead wire Yc also has the substantially rectangular cross section. Each of the first lead wires Xc and Zc is jointed to the third lead wire Yc with a shorter side of the substantially rectangular cross section of the third lead wire Yc (or alternatively the first lead wire) abutting a longer side of the substantially rectangular cross section of the first lead wire (or alternatively the third lead wire Yc).

Consequently, when a bending load is imposed on the joint T in a longer-side direction of the first lead wires Xc and Zc (or alternatively the third lead wire Yc), the bending load will be applied to the third lead wire Yc (or alternatively the first lead wires Xc and Zc) in the shorter-side direction thereof. Consequently, it is possible to improve the strength of the joint T against the bending load.

In the present embodiment, each of the phase windings x-z and u-w of the stator coil 32 is formed by first inserting the electric conductor segments 30 and 30' into the corresponding slots 310 of the stator core 31 and then joining pairs of the corresponding end portions of the electric conductor segments 30 and 30.

With the above method, it is possible to easily and reliably forming the stator coil 32, thereby improving the productivity of the stator 3.

While the above particular embodiment has been shown and described, it will be understood by those skilled in the art that various modifications, changes, and improvements may be made without departing from the spirit of the invention.

For example, in the previous embodiment, each of the phase windings x-z and u-w of the stator coil 32 is formed of the electric conductor segments 30 and 30' which have the substantially rectangular cross-sectional shape. However, each of the phase windings x-z and u-w of the stator coil 32 may also be formed of electric conductor segments which have other cross-sectional shapes (e.g., a substantially circular cross-sectional shape).

Furthermore, each of the phase windings x-z and u-w of the stator coil 32 may be formed of, instead of the electric conductor segments, a single continuous electric conductor wire which has a suitable cross-sectional shape (e.g., a substantially rectangular or circular cross-sectional shape).

Moreover, in the previous embodiment, the lead wires of the stator coil 32 are arranged as shown in FIG. 9. However, the lead wires of the stator coil 32 may be alternatively arranged in other manners such that at least one radially-extending part R is sandwiched between the rear-side coil end part 32R of the stator coil 32 and at least one circumferentially-extending part S. For example, the lead wires of the stator coil 32 may be alternatively arranged as shown in FIGS. 10-13.

Figure 13:
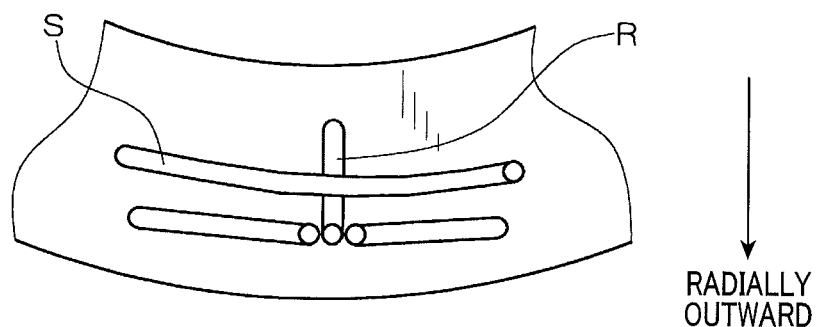
FIG. 13 is an axial end view illustrating the arrangement of lead wires according to a fourth modification.

In the previous embodiment, the joint T formed between the lead wires Xc, Yc and Zc is positioned radially inside the radially-extending parts R of the first lead wires Xc and Zc (see FIG. 9). However, in cases where the axial distances between the front and rear end walls of the frame 4 of the alternator 1 and the stator 3 are sufficiently large and thus it is unnecessary to be concerned about interference between the joint T and the rear end wall of the frame 4, the joint T may be positioned radially outside the radially-extending part (or parts) R as shown in FIG. 13.

Figure 14:
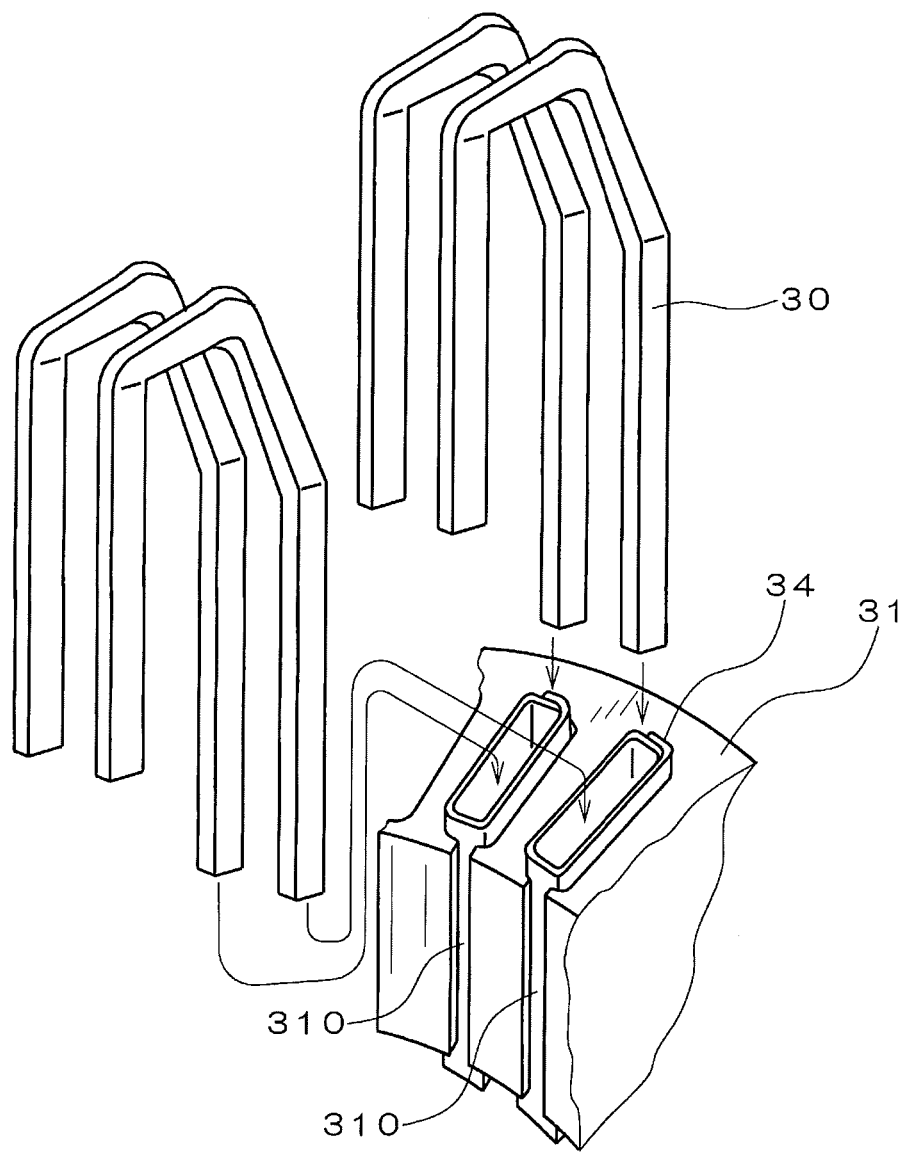
FIG. 14 is a perspective view illustrating the configuration of electric conductor segments forming the stator coil according to a fifth modification.

In the previous embodiment, the stator coil 32 is formed of the plurality of pairs of the large and small electric conductor segments 331 and 332. However, as shown in FIG. 14, the stator coil 32 may be formed of a plurality of identical electric conductor segments 30 which are substantially U-shaped. Moreover, with the identical electric conductor segments 30, the stator coil 32 may be formed in a wave winding manner on the stator core 31.

In the previous embodiment, the stator coil 32 is comprised of the first and second three-phase coils 32A and 32B each of which is Y-connected. However, the stator coil 32 may also be comprised of a pair of three-phase windings each of which is Δ-connected. Moreover, the stator coil 32 may also be comprised of a pair of three-phase windings one of which is Y-connected and the other is Δ-connected. Furthermore, the stator coil 32 may be made up of only one three-phase coil which is either Y-connected or Δ-connected.

In the previous embodiment, the present invention is applied to the stator 3 of the automotive alternator 1. However, the invention can also be applied to stators of other rotating electric machines, such as a stator of an electric motor and a stator of a motor-generator that can selectively function either as an electric motor or as an electric generator.

What is claimed is:

1. A stator for a rotating electric machine, the stator comprising:
    an annular stator core having a plurality of slots formed therein, the slots being spaced from one another in a circumferential direction of the stator core;
    a stator coil comprised of a plurality of windings mounted on the stator core, the stator coil having a coil end part that protrudes from an axial end face of the stator core; and
    a plurality of lead wires each of which is made up of a corresponding one of end portions of the windings of the stator coil, the plurality of lead wires including, at least, a first lead wire and a second lead wire, the first lead wire adjoining the coil end part of the stator coil and having both (1) a circumferentially-extending part that extends in a circumferential direction of the stator core and (2) a radially-extending part that extends in a radial direction of the stator core, the second lead wire having a circumferentially-extending part that extends in the circumferential direction of the stator core and adjoins and intersects the radially-extending part of the first lead wire, the radially-extending part of the first lead wire being sandwiched between and in abutment with both the circumferentially-extending part of the second lead wire and the coil end part of the stator coil, the radially-extending part of the first lead wire abutting the coil end part of the stator coil over an entire radial length of the radially-extending part.

2. The stator as set forth in claim 1, wherein the plurality of lead wires further include a third lead wire in addition to the first and second lead wires,
    the first lead wire is jointed to the third lead wire at a spot positioned radially inside the radially-extending part of the first lead wire.

3. The stator as set forth in claim 1, wherein the radially-extending part of the first lead wire is formed prior to the mounting of the winding, which includes the first lead wire as its end portion, on the stator core.

4. The stator as set forth in claim 1, wherein each of the first and second lead wires has a substantially rectangular cross section.

5. The stator as set forth in claim 4, wherein the plurality of lead wires further include, in addition to the first and second lead wires, a third lead wire which also has a substantially rectangular cross section, and
    the first lead wire is jointed to the third lead wire with a shorter side of the substantially rectangular cross section of one of the first and third lead wires abutting a longer side of the substantially rectangular cross section of the other of the first and third lead wires.

6. The stator as set forth in claim 1, wherein each of the windings of the stator coil is formed of a plurality of electric conductor segments inserted in corresponding ones of the slots of the stator core.

* * * * *